US011676329B1

(12) United States Patent
Ma et al.

(10) Patent No.: US 11,676,329 B1
(45) Date of Patent: Jun. 13, 2023

(54) MOBILE DEVICE HOLOGRAPHIC CALLING WITH FRONT AND BACK CAMERA CAPTURE

(71) Applicant: Meta Platforms Technologies, LLC, Menlo Park, CA (US)

(72) Inventors: Jing Ma, Mill Creek, WA (US); Paul Armistead Hoover, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/570,744

(22) Filed: Jan. 7, 2022

(51) Int. Cl.

| | |
|---|---|
| ***G06T 15/10*** | (2011.01) |
| ***G06T 17/20*** | (2006.01) |
| ***G06T 15/04*** | (2011.01) |
| ***G06T 7/70*** | (2017.01) |
| ***G06T 7/55*** | (2017.01) |
| ***H04L 67/131*** | (2022.01) |

(52) U.S. Cl.
CPC ................ *G06T 15/10* (2013.01); *G06T 7/55* (2017.01); *G06T 7/70* (2017.01); *G06T 15/04* (2013.01); *G06T 17/20* (2013.01); *H04L 67/131* (2022.05); *G06T 2207/30196* (2013.01)

(58) Field of Classification Search
None
See application file for complete search history.

(56) References Cited

U.S. PATENT DOCUMENTS 9,841,814 B1 12/2017 Kallmeyer et al.
9,959,676 B2 5/2018 Barzuza et al.
10,298,587 B2 5/2019 Hook et al.
10,499,033 B2 12/2019 Pesonen
10,554,931 B1 2/2020 Zavesky et al.
(Continued)

FOREIGN PATENT DOCUMENTS

WO 2020117657 A1 6/2020
WO 2021062278 A1 4/2021

OTHER PUBLICATIONS

Yang B., et al., "3D Object Reconstruction from a Single Depth View with Adversarial Learning," Proceedings of the EEE International Conference on Computer Vision Workshops, 2017, pp. 679-688.

Gupta K., et al., "Do You See What I See? The Effect of Gaze Tracking on Task Space Remote Collaboration," IEEE Transactions on Visualization and Computer Graphics, Nov. 2016, vol. 22, No. 11, pp. 2413-2422, DOI: 10.1109/TVCG.2016.2593778.

(Continued)

*Primary Examiner* — Frank S Chen
(74) *Attorney, Agent, or Firm* — Potomac Law Group, PLLC

(57) ABSTRACT

Aspects of the present disclosure are directed to a holographic calling system providing holographic calling between an artificial reality device and a mobile device having both front and back facing cameras. The user of the mobile device can position it so one of the cameras is pointed toward their face and another camera captures the user's hand not holing the mobile device. The holographic calling system can automatically determine the position of the mobile device in relation to the user's face and hand. Once the mobile device is positioned within an appropriate capture zone, the captured images of the user's face are used to create a first representation of the sending user's face, the captured images of the user's hand are used to create a second representation of the sending user's hand. Each representation is provided as output from a receiving artificial reality device, positioned relative to each other.

20 Claims, 11 Drawing Sheets

(56) References Cited

U.S. PATENT DOCUMENTS

| | | | | |
|---|---|---|---|---|
| 10,582,191 | B1 | 3/2020 | Marchak, Jr. et al. | |
| 10,952,006 | B1 | 3/2021 | Krol et al. | |
| 11,055,514 | B1 | 7/2021 | Cao et al. | |
| 11,140,361 | B1 | 10/2021 | Krol et al. | |
| 2002/0158873 | A1 | 10/2002 | Williamson | |
| 2011/0107270 | A1 | 5/2011 | Wang et al. | |
| 2015/0279044 | A1 | 10/2015 | Kim et al. | |
| 2015/0317832 | A1 | 11/2015 | Ebstyne et al. | |
| 2017/0083754 | A1 | 3/2017 | Tang et al. | |
| 2018/0070115 | A1* | 3/2018 | Holmes | H04N 21/2187 |
| 2018/0101989 | A1 | 4/2018 | Frueh et al. | |
| 2018/0144212 | A1 | 5/2018 | Burgos et al. | |
| 2018/0158246 | A1 | 6/2018 | Grau et al. | |
| 2018/0234671 | A1 | 8/2018 | Yang et al. | |
| 2019/0042832 | A1 | 2/2019 | Venshtain | |
| 2019/0045157 | A1 | 2/2019 | Venshtain et al. | |
| 2019/0058870 | A1 | 2/2019 | Rowell et al. | |
| 2019/0346522 | A1 | 11/2019 | Botnar et al. | |
| 2019/0371279 | A1 | 12/2019 | Mak | |
| 2020/0090350 | A1 | 3/2020 | Cho et al. | |
| 2020/0117267 | A1* | 4/2020 | Gibson | G06F 3/011 |
| 2020/0118342 | A1 | 4/2020 | Varshney et al. | |
| 2020/0142475 | A1 | 5/2020 | Paez et al. | |
| 2020/0279411 | A1 | 9/2020 | Atria et al. | |
| 2020/0371665 | A1 | 11/2020 | Clausen et al. | |
| 2021/0019541 | A1 | 1/2021 | Wang et al. | |
| 2021/0165492 | A1* | 6/2021 | Ohashi | A63F 13/65 |
| 2021/0248727 | A1 | 8/2021 | Fisher et al. | |
| 2021/0263593 | A1 | 8/2021 | Lacey | |
| 2021/0287430 | A1 | 9/2021 | Li et al. | |
| 2021/0390767 | A1 | 12/2021 | Johnson et al. | |

OTHER PUBLICATIONS

International Search Report and Written Opinion for International Application No. PCT/US2021/038992, dated Oct. 29, 16 pages.

Unknown., “A Better Way to Meet Online,” Gather, https://www.gather.town/, Last Accessed Oct. 11, 2021.

Chen Z., et al., “Estimating Depth from RGB and Sparse Sensing,” European Conference on Computer Vision (ECCV) 2018, Apr. 9, 2018, 22 pages.

Croitoru I., et al., “Unsupervised Learning of Foreground Object Segmentation,” International Journal of Computer Vision (IJCV), May 13, 2019, vol. 127, No. 9, May 13, 2019, 24 pages.

Frueh C., et al., “Headset removal for virtual and mixed reality,” ACMSIGGRAPH Talks, 2017, 2 pages.

International Search Report and Written Opinion for International Application No. PCT/US2022/031497, dated Sep. 29, 2022, 11 pages.

International Search report and Written Opinion for International Application No. PCT/US2022/039453, dated Nov. 29, 2022, 16 pages.

Kuster C., et al., “Towards Next Generation 3D Teleconferencing Systems,” 2012 3DTV-Conference: The True Vision—Capture, Transmission, and Display of 3D Video (3DTV-CON), Oct. 15, 2012, pp. 1-4.

Wei S. E., et al., “VR Facial Animation via Multiview Image Translation,” ACM Transactions on Graphics (TOG), 2019, vol. 38, No. 4, pp. 1-16.

Wilson A.D., “Fast Lossless Depth Image Compression,” Proceedings of the 2017 ACM International Conference on Interactive Surfacesand Spaces, Oct. 17, 2017, pp. 100-105.

* cited by examiner

MOBILE DEVICE HOLOGRAPHIC CALLING WITH FRONT AND BACK CAMERA CAPTURE

TECHNICAL FIELD

The present disclosure is directed to implementing a holographic call between an artificial reality device and mobile device using both the mobile device's front and back facing cameras.

BACKGROUND

Video conferencing has become a major way people connect. From work calls to virtual happy hours, webinars to online theater, people feel more connected when they can see othe participants, bringing them closer to an in-person experience. However, video calls remain a pale imitation of face-to-face interactions. Understanding body language and context can be difficult with only a two-dimensional ("2D") representation of a sender. Further, interpersonal interactions with video are severely limited as communication often relies on relational movements between participants. With video calling, participants are unable to perform movements in relation to one another. In addition, the limitation of video calling on a flat panel display introduces an intrusive layer of technology that can distract from communication and diminishes the perception of in-person communication.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
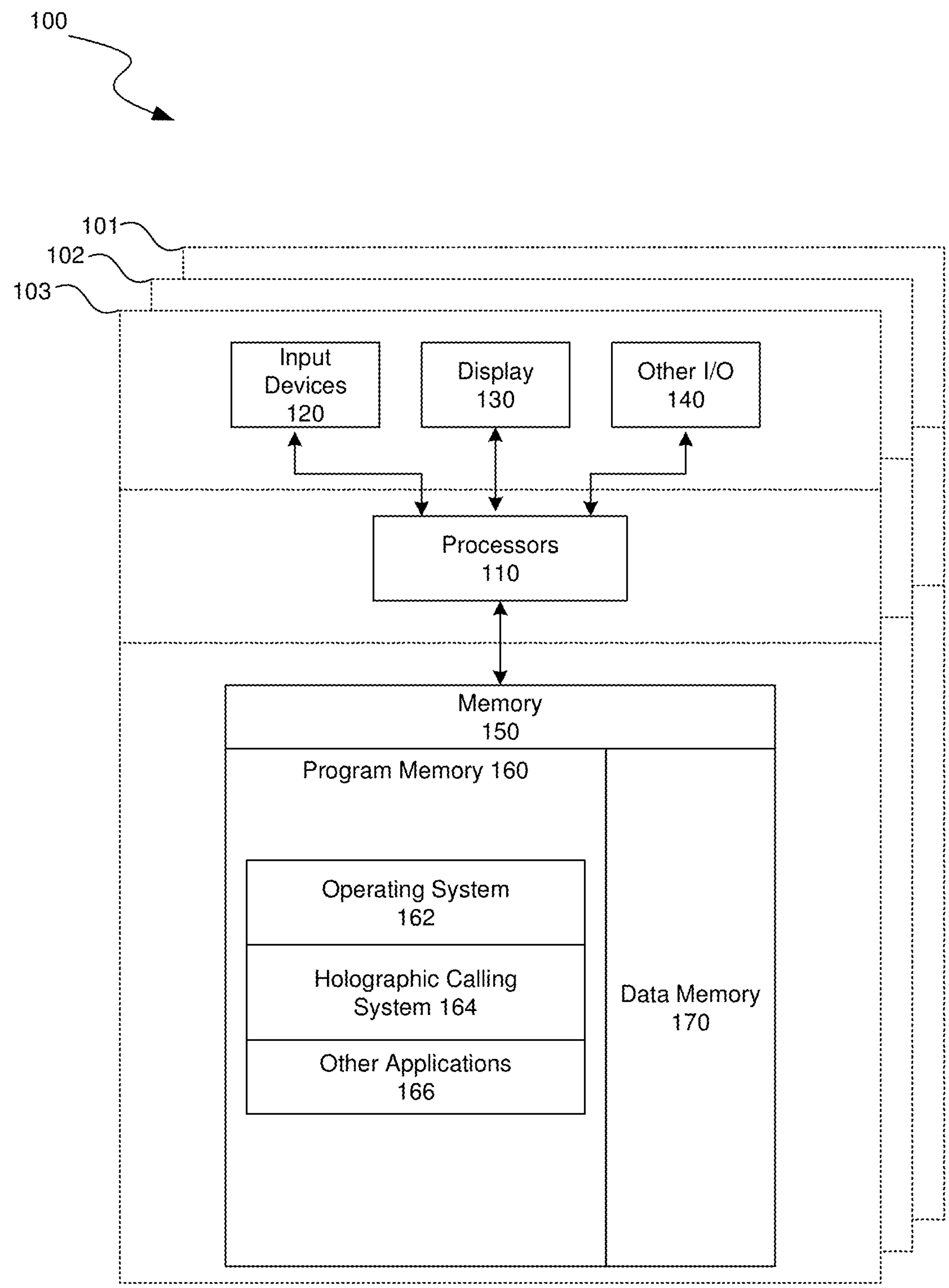
FIG. 1 is a block diagram illustrating an overview of devices on which some implementations of the present technology can operate.

Aspects of the present disclosure are directed to a holographic calling system providing holographic calling between an artificial reality device and a mobile device having both front and back facing cameras. The user of the mobile device can position it so one of the cameras is pointed toward their face and another camera captures the user's hand not holing the mobile device. The holographic calling system captures images of portions of the user from both the front-facing and back-facing cameras, providing different views of portions of the sending user (a facial/upper torso portion and a hand/arm portion). The holographic calling system can automatically determine the position of the mobile device in relation to the user's face and hand and, if necessary, instruct the user on repositioning the mobile device and/or her hand. Once the mobile device is positioned within an appropriate capture zone, the captured images of the user's face are used to create a first representation of the sending user's face, the captured images of the user's hand are used to create a second representation of the sending user's hand, and each are provided as output from a receiving artificial reality device, positioned relative to each other based on the determined hand and face positions of the sending user.

Depending on the capabilities of the mobile device the mobile device may simultaneously capture images from the front and back facing cameras or may alternate between enabling each camera. In some implementations where the mobile device has an array of multiple cameras facing one direction and/or a depth sensor facing either direction, the mobile device may also directly capture depth data for the captured images. In other implementations, a machine learning model may be applied to estimate depth data for captured images. In yet further implementations, a user may be wearing a device such as a smart bracelet or ring on her hand, and/or glasses or earphones on her face and distances between the mobile device and these devices can be measured (e.g., based on travel time for signals traveling at as a known velocity). In some implementations, the distances can be refined using a kinematic model defining user armspan lengths. Based on these distance determinations, the holographic calling system can determine whether the mobile device is positioned in a capture zone, i.e., is within a threshold distance of the midpoint between the user's hand and face, there is at least a minimum distance between the mobile device and the user's hand and at least a minimum distance between the mobile device and the user's face, and the mobile device is correctly angled to capture each of the user's hand and face.

When the mobile device is not correctly positioned, the holographic calling system can determine how the mobile device should be moved to put it within the capture zone. The holographic calling system can then provide affordances to instruct the user on how to move the mobile device and/or her hand. These affordances can, for example, include arrows displayed on the mobile device screen, adding blurring and focus filters to the mobile device screen, providing a silhouette or other indicator of where to move the mobile device, etc.

Once the mobile device position has been positioned correctly, either initially or following instruction to the user through affordances, the holographic calling system can generate sending user representations. In some implementations, this can include applying the depth and other position information to a kinematic model (either generic or user-specific) to determine body positions of the sending user. In other implementations, the body positions of the sending user can be determined by directly estimating body positions from the captured depth data. In some cases, the body positions can then be used to generate an avatar representation of the sending user (which may be life-like from scans of the sending user or a synthetic model) with the determined body positions. In other implementations, the holographic calling system can generate a first holographic representation of the sending user by generating a hologram of the user's face and torso from the images of the camera facing those body parts, can generate a second holographic representation of the sending user by generating a hologram of the user's hand and arm from the images of the camera facing those body parts, and can have the output from an artificial reality device position each relative to each other according to the determined body positions.

When creating the holograms, the holographic calling system may extrapolate portions of the sending user not shown in the captured images. For example, a sending user may be holding up her hand with her palm facing away from the sending user. The recipient user may be viewing the hologram of the sending user's hand from the opposite side as the mobile device (i.e., the mobile device captures the back of the user's hand, but the recipient user sees the front of the sending user's palm). Thus the holographic calling system may generate a hand hologram that positions the hand according to the determined hand position of the sending user, but paints a generic palm texture onto the portion of the hand the mobile device did not capture.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

While there are existing visual communication systems that use mobile devices, they tend to only provide flat-panel types of communications (e.g., video calls), which fail to enable communications comparable to in-person interactions. Some holographic calling systems are being developed, however they tend to require both the sending user and the recipient user to have specialized artificial reality device hardware, limiting which users can employ these technologies. For example, existing video calling systems limit how much body language can be perceived, fail to provide the ability for users to move relative to each other, and introduce an intrusive layer of technology that can distract from the communication and diminish the perception of in-person communication. Further, existing holographic calling technologies only allow holographic calls with other users having the same holographic system, limiting adoption, presenting extreme cost, and failing to allow existing hardware to interface with the artificial reality devices.

The holographic calling system and processes described herein are expected to overcome these problems associated with conventional video and 3D interaction techniques and are expected provide holographic calling between users where at least one of whom is using a mobile device (i.e., smartphone or tablet). By including techniques that can utilize the capabilities of the available mobile devices, the holographic calling system can allow user interactions beyond the capabilities of existing systems. In addition, the processes and systems to achieve these results are not analogs of existing communication techniques, but instead introduce completely new ways capturing multiple views of a user from a single mobile device and representing those multiple views relationally in a holographic call. Thus, unlike the existing video calling techniques that capture a single mobile device user view, the disclosed holographic calling system can generate holographic representations from a mobile device, can account for user movement and positions, and can format data to allow a recipient user to view multiple holograms of the sending user, correctly positioned relative to one other.

Several implementations are discussed below in more detail in reference to the figures. FIG. 1 is a block diagram illustrating an overview of devices on which some implementations of the disclosed technology can operate. The devices can comprise hardware components of a computing system 100 that can implement a holographic call between an artificial reality device and mobile device using both the mobile device's front and back cameras. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, holographic calling system 164, and other application programs 166. Memory 150 can also include data memory 170 that can include, e.g., images captured from front and back facing cameras on a mobile device, position data for a mobile device and a user's body parts, kinematic models, content item for affordances, holograms generated from front and back facing mobile device cameras, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
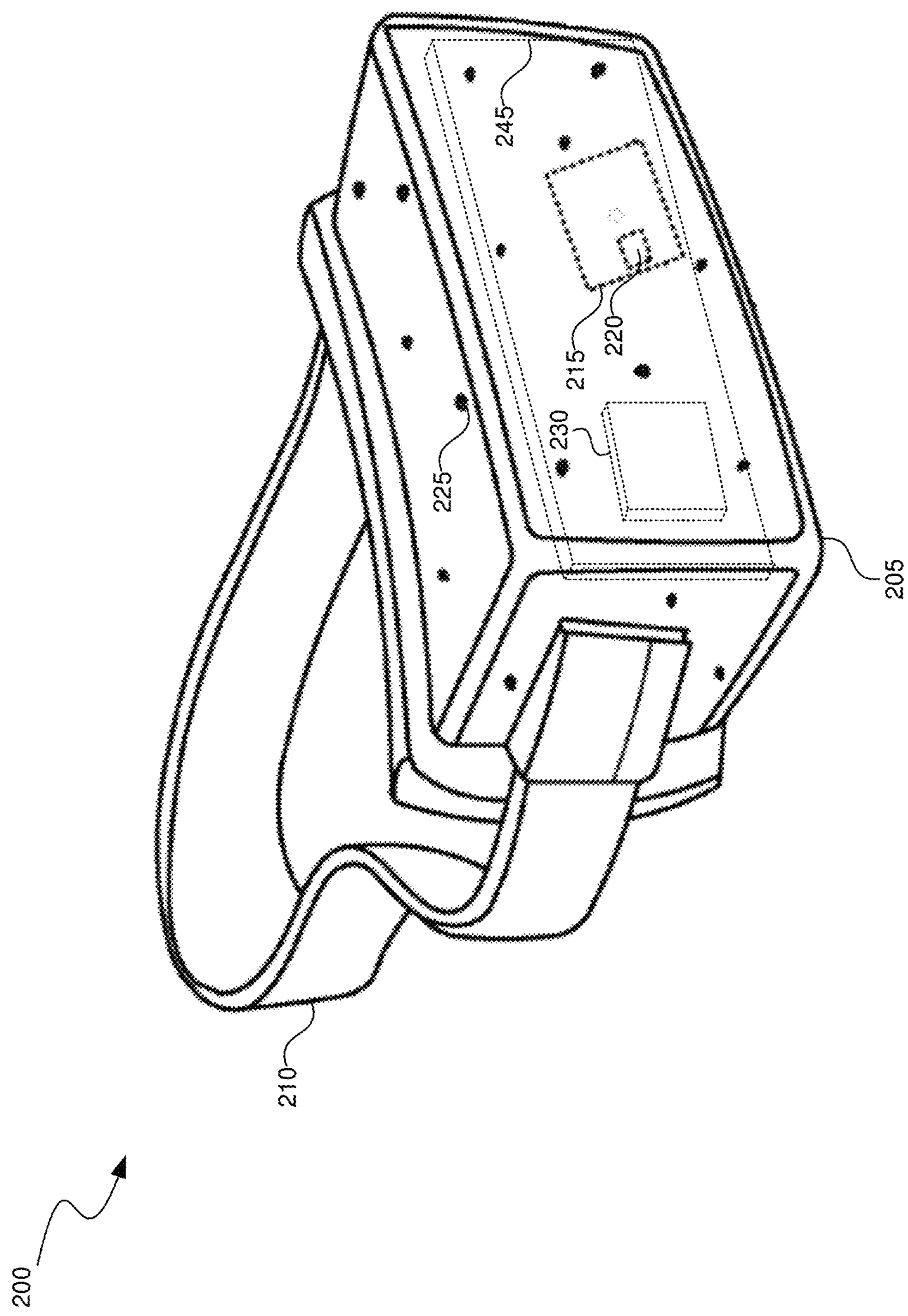
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other noncamera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
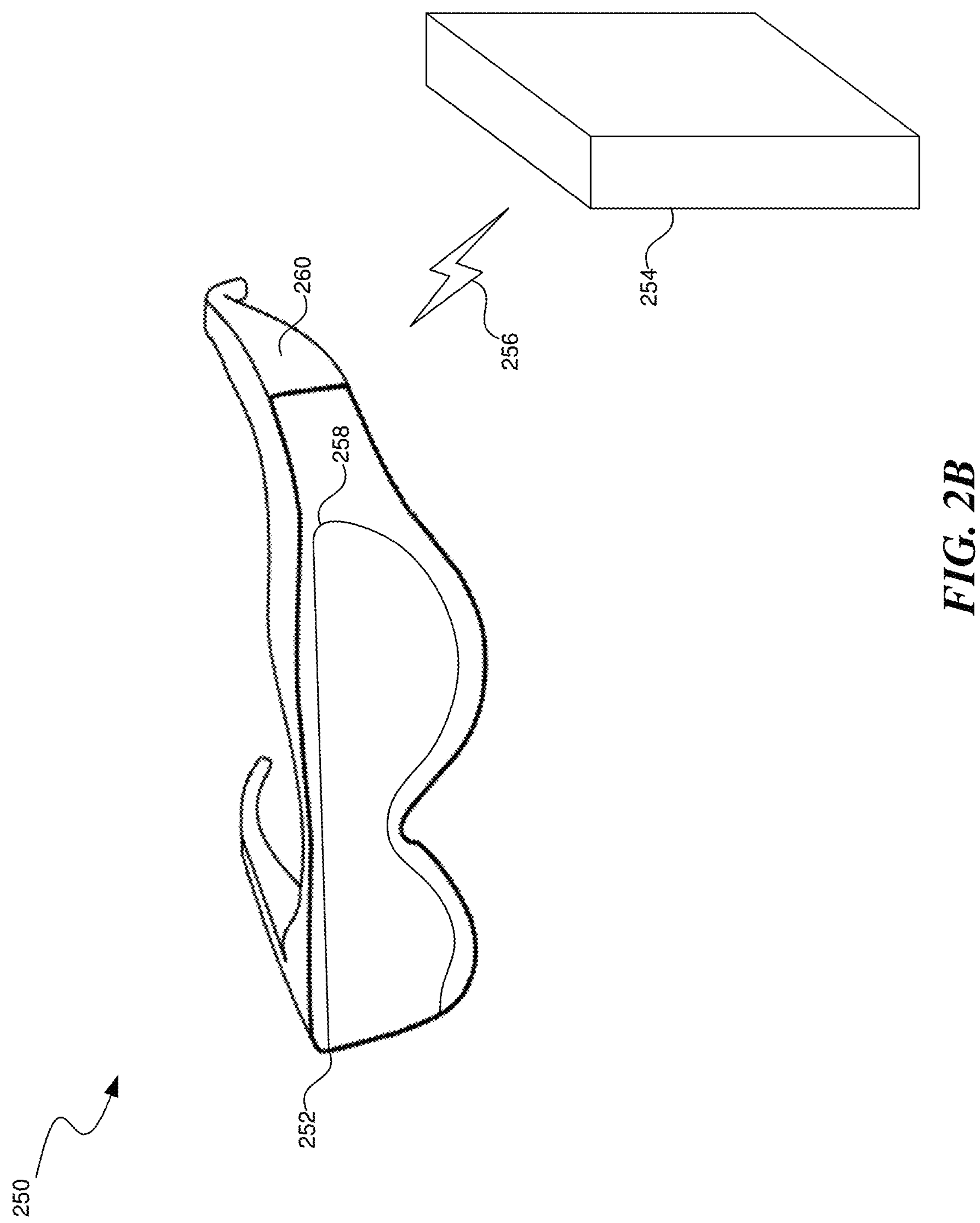
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
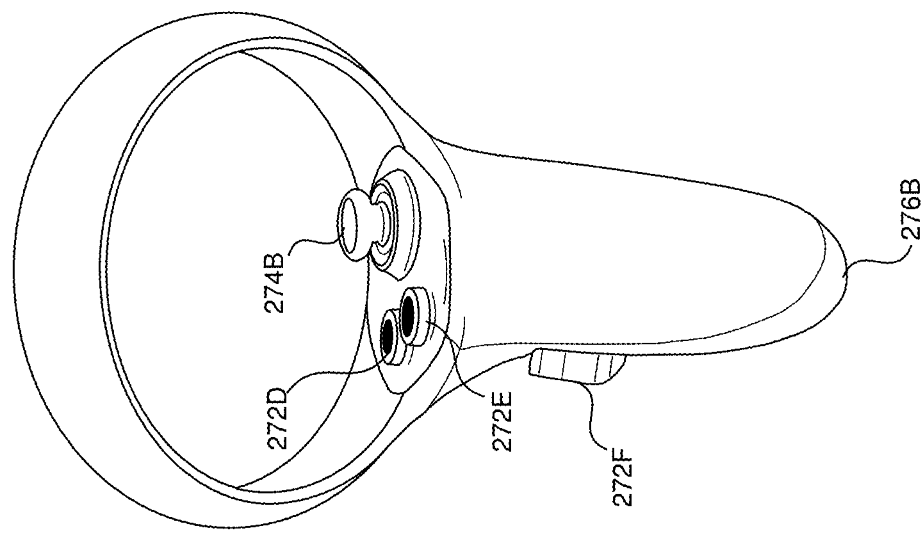
FIG. 2C is a wire diagram illustrating controllers which, in some implementations, a user can hold in one or both hands to interact with an artificial reality environment.
Figure 2C:
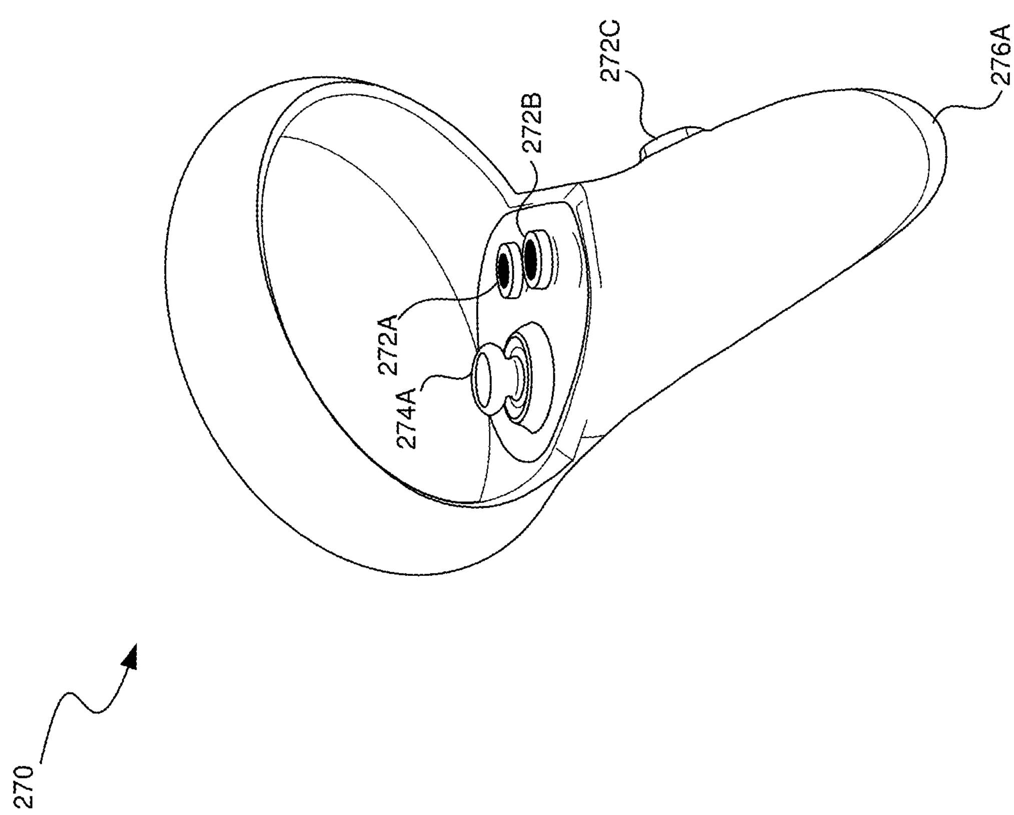

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
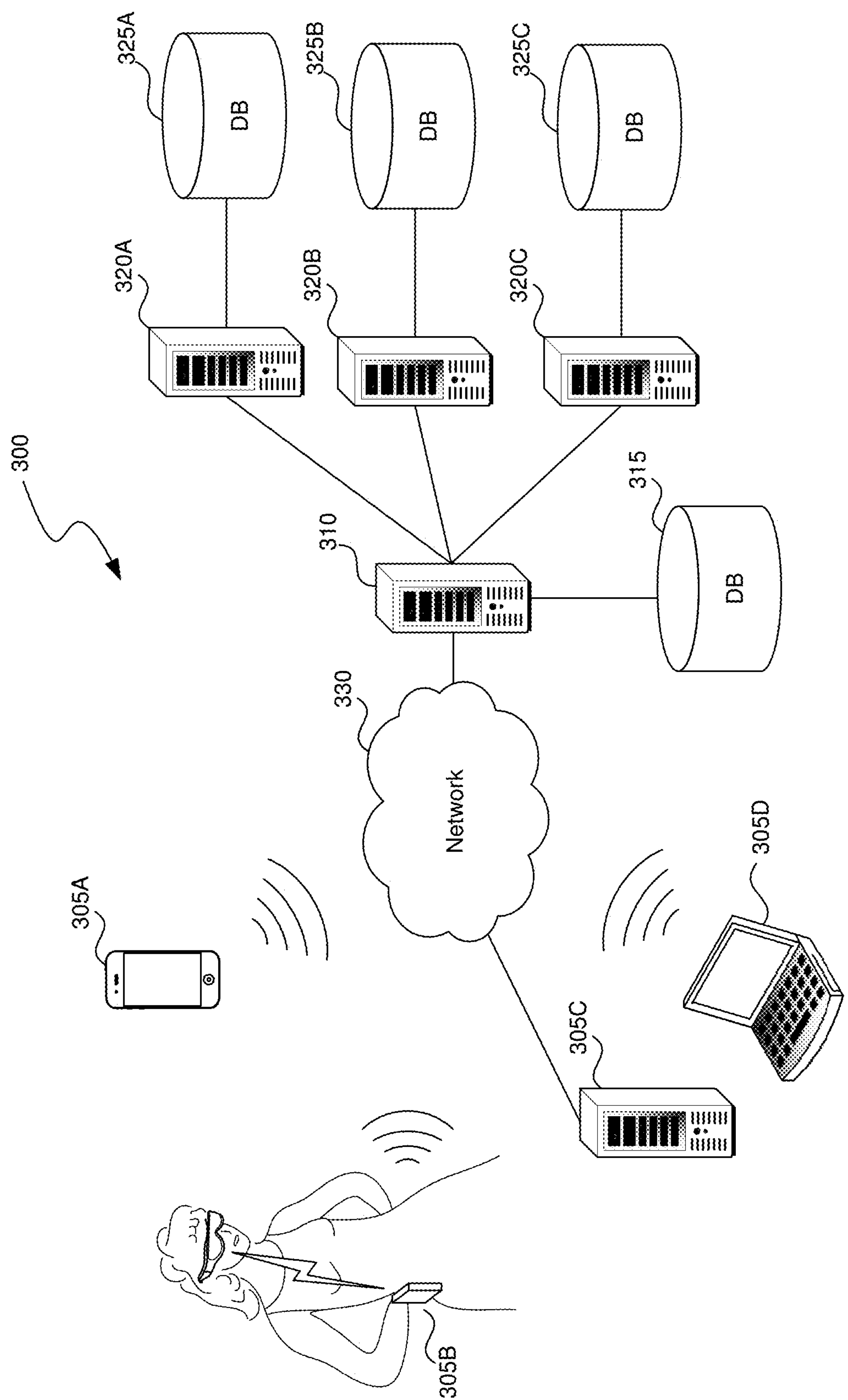
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
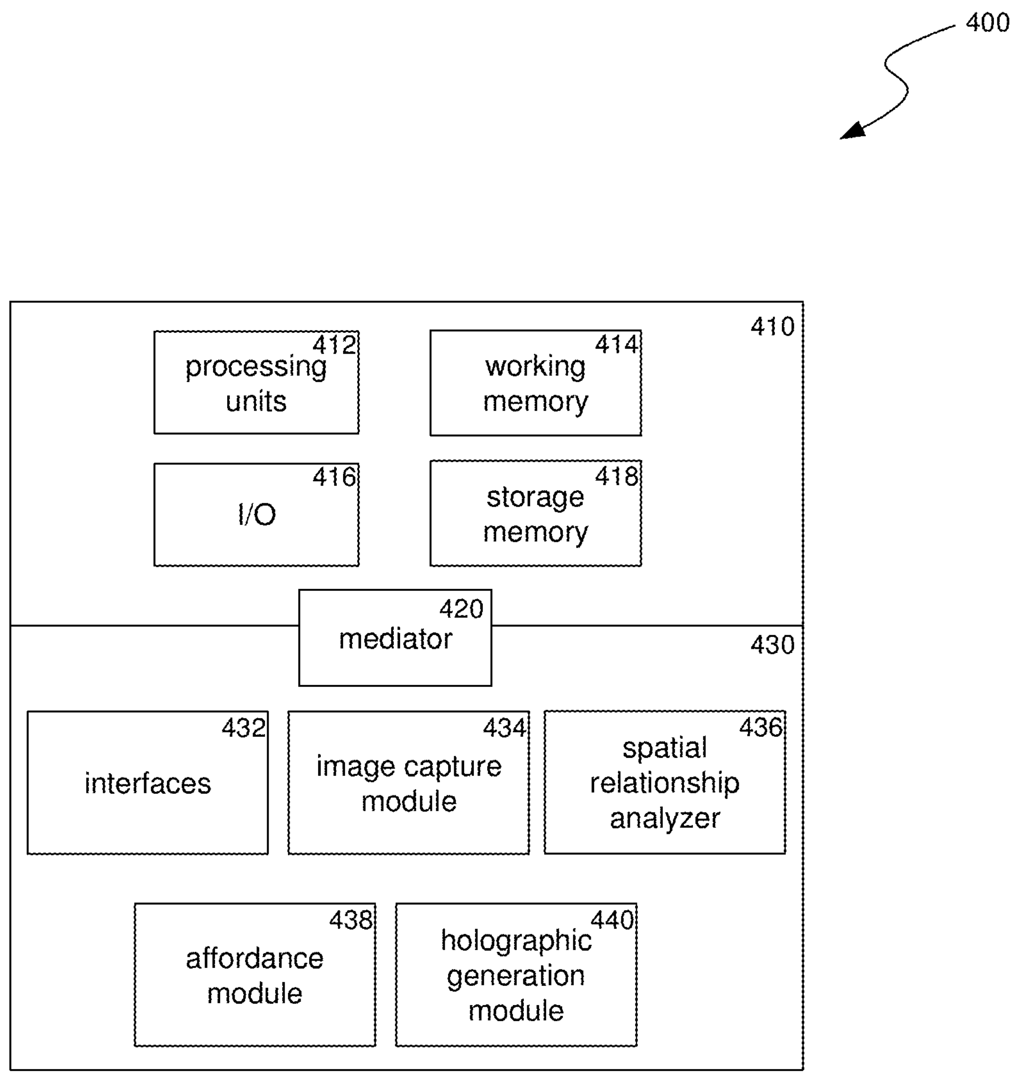
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for implementing a holographic call between an artificial reality device and mobile device using front and back facing cameras of the mobile device. Specialized components 430 can include an image capture module 434, a spatial relationship analyzer 436, an affordance module 438, a holographic generation module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The image capture module 434 can capture, via a mobile device, images of a sending user from both a front-facing camera and a back-facing camera, thus capturing images of the sending user's face and hand (the one not holding the mobile device).

Additional details on using front and back facing cameras of a mobile device to capture views of different body parts of the sending user are provided below in relation to block 502 of FIG. 5 and in relation to FIGS. 6 and 7.

The spatial relationship analyzer 436 can analyze images and/or depth data captured by a mobile device to determine a first spatial relationship including a distance and orientation between the mobile device and a sending user's face and a second spatial relationship including a distance and orientation between the mobile device and a sending user's hand. Additional details on determining spatial relationships between a mobile device and parts of a sending user are provided below in relation to block 504 of FIG. 5 and in relation to FIG. 7.

The affordance module 438 can determine, based on the spatial relationships determined by spatial relationship analyzer 436, whether the mobile device capturing the images is in a capture zone (e.g., is within a threshold distance of the midpoint between the sending user's hand and face, is a threshold distance away from each, and/or is angled to capture each). When the mobile device is not in the capture zone, the affordance module 438 can provide affordances (e.g., arrows, blurring effects, text, etc.) instructing the sending user on moving the mobile device and/or her hand to have the mobile device in the capture zone. Additional details on determining whether a mobile device is in a capture zone and, if not, providing affordances are provided below in relation to blocks 506 and 508 of FIG. 5 and in relation to FIGS. 7 and 8.

The holographic generation module 440 can use the images captured by image capture module 434 and the spatial relationships determined by spatial relationship analyzer 436 to generate a representation of the sending user's face and a representation of the sending user's hand, and place them relative to one another by a recipient artificial reality device. In some cases, the representations are part of an avatar of the sending user positioned according to the determined spatial relationships. In other cases, the representations are holograms of the sending user generated and positioned according to the images and determined spatial relationships. Additional details on generating and displaying representations of the sending user are provided below in relation to block 510 of FIG. 5 and in relation to FIGS. 9A and 9B.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
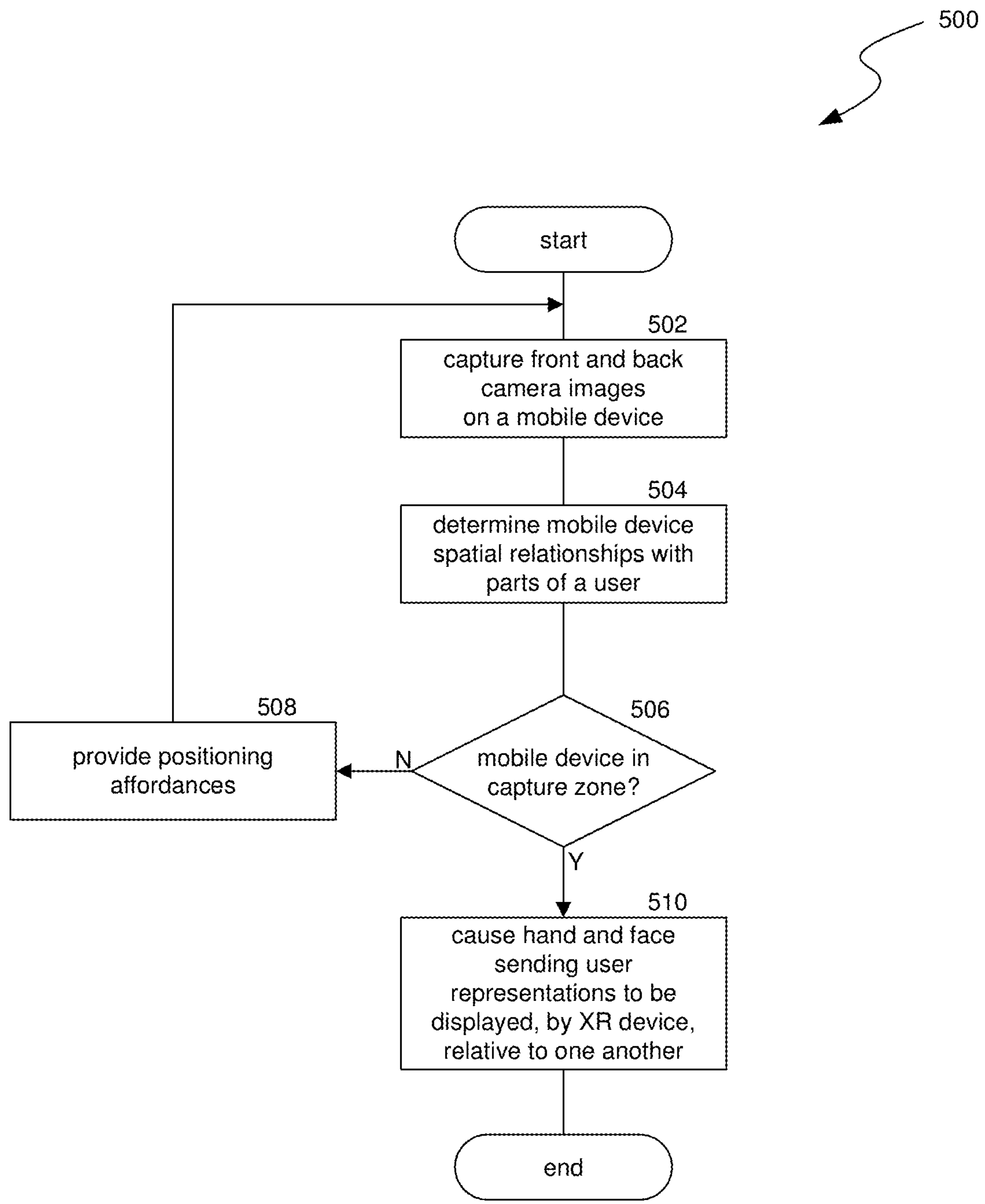
FIG. 5 is a flow diagram illustrating a process used in some implementations of the present technology for a mobile device to capture front and back camera images for a holographic call with an artificial reality device.

FIG. 5 is a flow diagram illustrating a process 500 used in some implementations of the present technology for a mobile device to capture front and back camera images for a holographic call with an artificial reality device. In some cases, process 500 can be performed in response to a user initiating a holographic call with a mobile device. In various implementations, process 500 can be performed on a mobile device engaged in a holographic call or on a server system providing services to such a mobile device.

At block 502, process 500 can capture images with both front and back facing cameras on a mobile device. Depending on the capabilities of the mobile device, the mobile device may capture these images simultaneously or may capture the images iteratively first from the camera(s) facing one direction then from the camera(s) facing the other direction. In some implementations, the mobile device may capture RGB, grayscale, and/or depth images. In some implementations, a mobile device may include multiple cameras facing in one or both directions. For example, the mobile device may include an array of cameras allowing the camera to capture images from different perspectives to generate depth data. In other implementations, the cameras may otherwise enable depth capturing, e.g., using a stereoscopic (multi-lens) depth camera; radar, lidar, sonar, or other time-of-flight (ToF) sensors; a structured light system (e.g., where a grid of captured inferred (IR) points are analyzed for distortion or time of flight readings to precisely identify the distance from the IR source to each point); or other depth sensing technologies. In some implementations, the mobile device can obtain just RGB or greyscale images and these images can be applied to a machine learning model trained to estimate depth data for portions of the image. Additional information on such depth estimations is provided in U.S. patent application Ser. No. 17/360,693, filed Jun. 28, 2021, titled "Holographic Calling for Artificial Reality," which is hereby incorporated by reference in its entirety.

At block 504, process 500 can determine a spatial relationship between the mobile device and a user's face and a spatial relationship between the mobile device and a user's hand. These spatial relationships can be determined by first applying, to each image, a machine learning model (or other computer vision technique) trained to recognize parts of a user (i.e., the user's face and a hand). In some implementations where depth data was determined at block 502, the depth data can then be taken for the identified parts of the image to determine the distance to that body part. In other implementations where there is no depth data, the distance can be estimated such as by determining an expected size of the body part and estimating a distance based on the measured size in the image or by computing a distance to a wearable device on the user's hand and/or face (e.g., a smart bracelet or ring on her hand, and/or glasses or earphone on her face and distances between the mobile device and these wearable devices can be measured based on signal travel time measurements). In some implementations, the determined spatial relationships can also determine orientations of the mobile device in relation to the body parts, e.g., whether the mobile device's cameras are pointed at the identified body part or angled to capture an unfocused view of the body part. In some implementations, the spatial relationships determined at block 504 can also include simultaneous location and mapping (SLAM) measurements for the mobile device, positioning the mobile device within a room. Using one of the mobile device's camera's (e.g., the rear facing camera), the mobile device can determine its position and orientation relative to the world around it. This can act as a root position for the mobile user's face and hand. Thus, the spatial relationship of the mobile user and the user of the artificial reality device can change as the mobile device's position and orientation changes relative to the world around it.

In some implementations, the spatial relationships determined at block 504 are 1) a distance and direction measurement between the mobile device and the user's face and upper torso and 2) a distance and direction measurement between the mobile device and the user's hand. In other implementations, the measured depth data for the identified body parts can be mapped to portions of a kinematic model (also sometimes referred to as a body model). A kinematic model can specify a body configuration of the sending user, e.g., distances between body points, such as the distance between the wrist and elbow joints, and angles between body parts, such as the angle between the forearm and upper arm or the direction of the head in relation to the shoulders—thus the kinematic model can limit the distances for body parts estimated by process 500 to those that match how a user's body can actually move. In some cases, a kinematic model can be for a portion of a user, such as just the user's hand and forearm or just the user's face and head. In various implementations, the kinematic model can be specific to the user (e.g., based on measurements of the user), can be estimated for users with a set of characteristics (e.g., based on a user's age, height, gender, weight, etc.), or can be generic to users generally. Additional information on kinematic models is provided in U.S. patent application Ser. No. 17/360,693, filed Jun. 28, 2021, titled "Holographic Calling for Artificial Reality," which is hereby incorporated by reference in its entirety. Mapping the depth data to the kinematic model can snap the measurements to an actual body configuration, providing more accurate spatial determinations.

At block 506, process 500 can determine whether the spatial relationships determined at block 504 indicate the mobile device is in a capture zone for the user's hand and face. A capture zone can be defined as a set of spatial properties of the mobile device, including one or more of: the mobile device being a certain proportional measurement between the user's hand and face (e.g., within 15% of the midpoint between the two), the mobile device having a minimum distance to each of the user's hand and the user's face (e.g., at least six inches from each), and/or the mobile device having a direction such that its cameras' centers of focus are each within a threshold distance of the user's face or hand (e.g., the center of camera focus is within 15% of the user's hand or face). In some implementations, only some of these spatial relationships are used for defining the capture zone. If the spatial relationships indicate the mobile device is in the capture zone, process 500 can continue to block 510; otherwise process 500 can continue to block 508.

At block 508, process 500 can provide positioning affordances to the user, directing the user to move the mobile device and/or her hand such that the mobile device is in the capture zone. The mobile device can be displaying a pass-through of the camera facing toward the user's hand with an overlay representation of the other user participating in the holographic call (referred to above as the receiving user). This representation can show the other user as a screen-locked or world-locked virtual object. The affordances can, in various implementations, include other overlays or effects such as a virtual object representing the mobile device (e.g., as a silhouette) located within the capture zone showing how to move or rotate the mobile device, one or more arrows or other direction indicators showing how to move or rotate the mobile device, a blurring effect which makes the view less blurred as the user moves the mobile device closer to the capture zone, words or an audio output instructing the user how to move or rotate the mobile device to be in the capture zone, etc. In one instance the affordance can show a virtual object as if the user is looking through a pipe and causing the user to position and rotate the mobile device so the pipe is focused on the recipient user and positioned in the capture zone. Following block 508, process 500 can repeat as the mobile device is repositioned and additional images are captured.

At block 510, process 500 can cause representations of the sending user's face and hand to be displayed, relative to one another, by an artificial reality device. In various implementations, the representations of the sending user can be generated, from the images captured at block 502, on the mobile device, on a computing system intermediate on a network between the mobile device and a recipient artificial reality device, or on the artificial reality device. In some implementations, one or both representations of the sending user can be generated by simply applying the position data determined at block 504 to an avatar of the sending user (which may be a lifelike model or a synthetic avatar, such as one with cartoon-like features). For example, a pre-scan of the sending user can have been performed creating a model of the sending user with proportions matching the sending user and can have textures applied from images of the sending user. That model can then be provided to the recipient artificial reality device and positioned according to the determined spatial relationships. An example of such a model is provided in FIG. 9B.

Figures 9A, 9B:
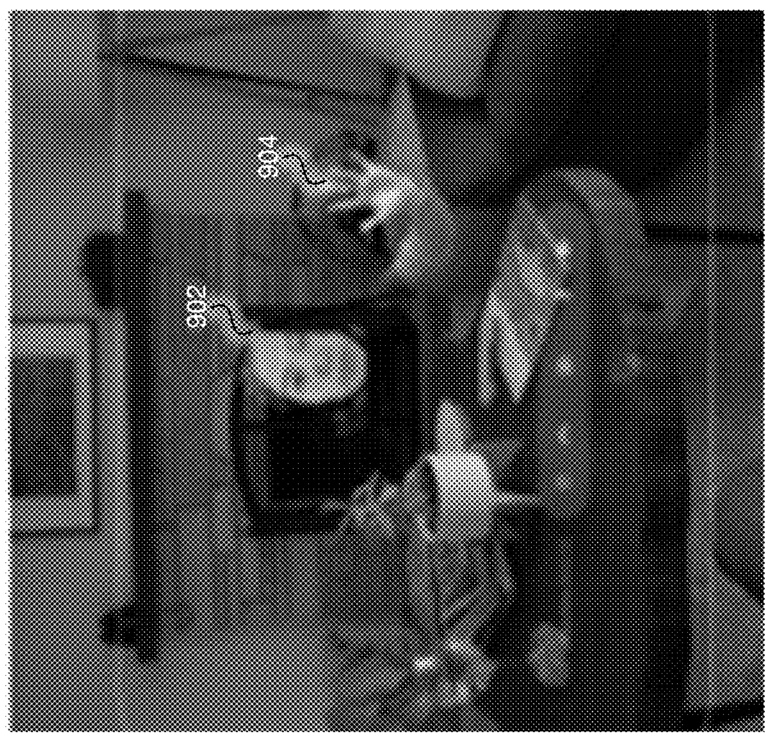
FIGS. 9A and 9B are conceptual diagrams illustrating examples of holographic representations provided by a recipient artificial reality device as a result of both hand and facial images captured by a sender mobile device.

In some cases, generating the sending user representations can include generating real-time holograms of one or both of the sending user's face (and possibly portions of her upper torso) or hand (and possibly forearm). For example, the depth information from block 502 can be used to generate 3D meshes of the sending user's face and/or of the sending user's hand and the image RGB data (masked to determine the portions of the images depicting the user's face or hand) can then be applied as a texture onto the generated 3D mesh to create a holographic representation of the portion of the sending user. The receiving artificial reality device can position each of the holographic representations of the user's face and hand relative to each other based on the spatial relationships determined at block 504 (i.e., such that the user's hand and face are positioned as they are on the sending user). In some implementations, these representations can be filled in to show uncaptured portions of the sending user (e.g., with estimated color and kinematic model data) or these models can show just the captured portions of the sending user (e.g., fading out at the edges as shown in FIG. 9A). In some cases, creating the sending user representations can include extrapolating portions of the sending user not shown in the captured images. For example, a sending user may be holding up her hand with her palm facing away from the sending user. The recipient user may be viewing the hologram of the sending user's hand from the opposite side as the mobile device (i.e., the mobile device captures the back of the user's hand, but the recipient user sees the front of the sending user's palm). Thus, the process can include generating a hand hologram that positions the hand according to the determined hand position of the sending user, but paints a generic palm texture onto the portion of the hand that the mobile device did not capture. An example of such a model is provided in FIG. 9A. Additional information on generating a hologram of a sending user from image data is provided in U.S. patent application Ser. No. 17/360,693, filed Jun. 28, 2021, titled "Holographic Calling for Artificial Reality," which is hereby incorporated by reference in its entirety.

In some implementations, while process 500 is causing the representations of the sending user's face and hand to be displayed by a recipient device, the recipient device is also sending a depiction of the recipient user to the mobile device, which the mobile device can display on its screen. For example, the mobile device may be providing a feed of the camera capturing the sending user's hand and can include the recipient user representation in the feed, e.g., as a world-locked or screen locked virtual object. In some cases, the position of the user's hand in the display can be used to cause interaction with displayed virtual objects and/or with a representation of the recipient user. For example, a shared virtual space can be defined between the sending and receiving users. Objects in this shared virtual space can be displayed on the mobile device's screen and by the recipient user's artificial reality device. An interaction with a virtual object by the sending user can cause a corresponding action with the virtual object as viewed by the recipient user. As another example, the sending user can move her hand to interact with recipient user's hologram (as shown in the overlay on her mobile device screen) such as to perform a high five, hand shake etc. Conversely, the recipient user can interact with sending user's hologram (as shown by her artificial reality device) to perform similar inter-user interactions. When users perform such interactions, both users could receive haptic feedback. For example, the mobile device can vibrate and the artificial reality device can provide haptic feedback via a wrist band or other haptic wearable device. In some cases, the position of the sending user, as displayed by the recipient user's artificial reality device and controlling how the sending user's actions are interpreted in relation to virtual objects in the shared virtual space, can be updated based on the SLAM data captured at block 502 and corresponding root position for the mobile user's face and hand determined at block 504. Process 500 can repeat as the call between the sending and receiving user continues, and can end when the call ends.

Figure 6:
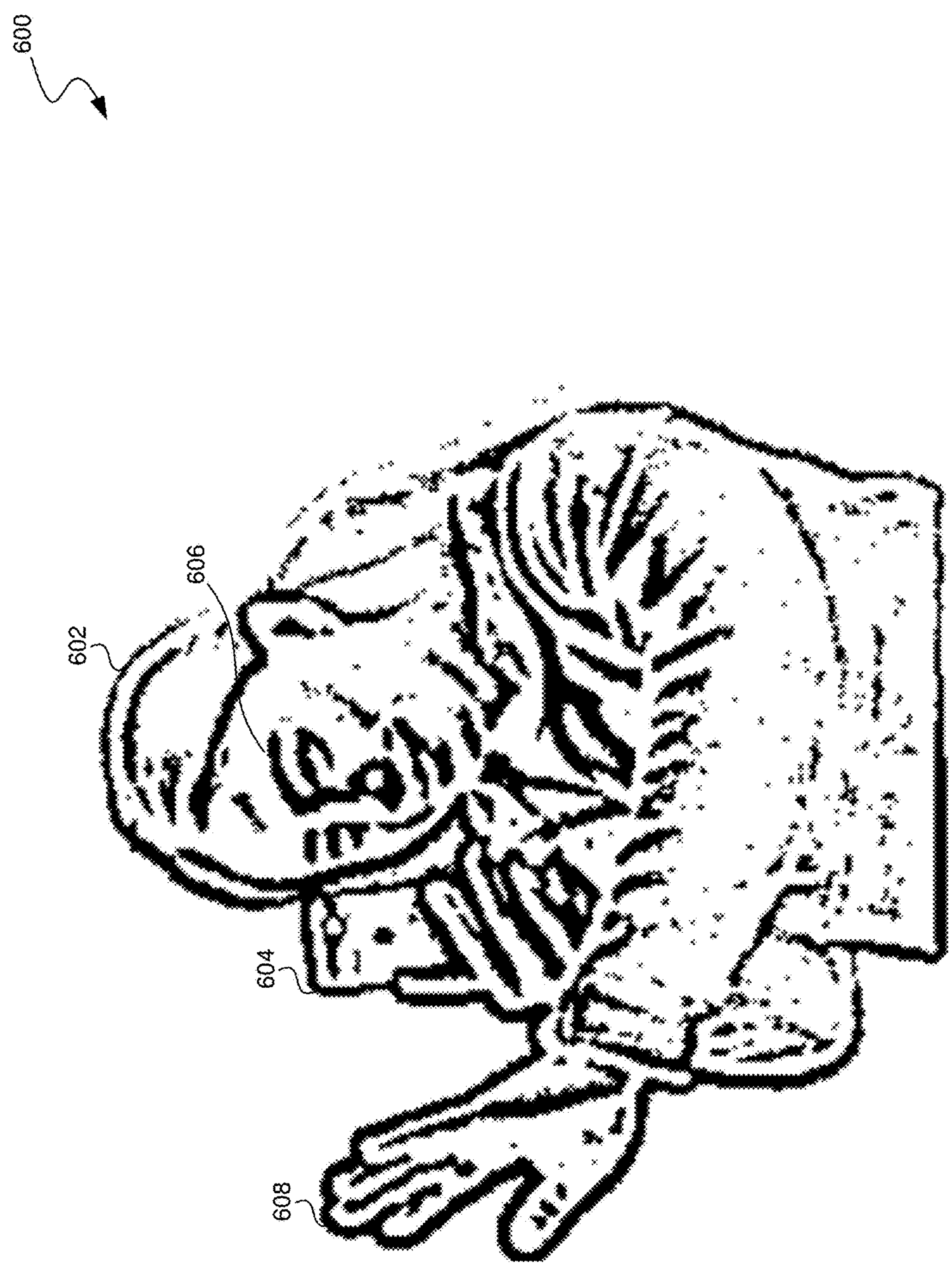
FIG. 6 is a conceptual diagram illustrating, from a perspective view, an example of a user using a mobile device to capture both hand and facial images.

FIG. 6 is a conceptual diagram illustrating an example 600 of a user using a mobile device to capture both hand and facial images from a perspective view. In example 600, a user 602 has entered a holographic call with a recipient user who has an artificial reality device. To provide a holographic representation of herself, the user 602 has positioned her mobile device 604 between her face 606 and her hand 608. This allows the front camera on her mobile device 604 to capture images of her face 606 and the back camera on her mobile device 604 to capture images of her hand 608. With these image, the holographic calling system can generate a holographic representation of the user's face 606 and a holographic representation of the user's hand 608, which the artificial reality device of the recipient user can render in spatial relationship to one another according to the determined positions of the mobile device 604 between the user's face 606 and hand 608 (illustrated further in example 700).

Figure 7:
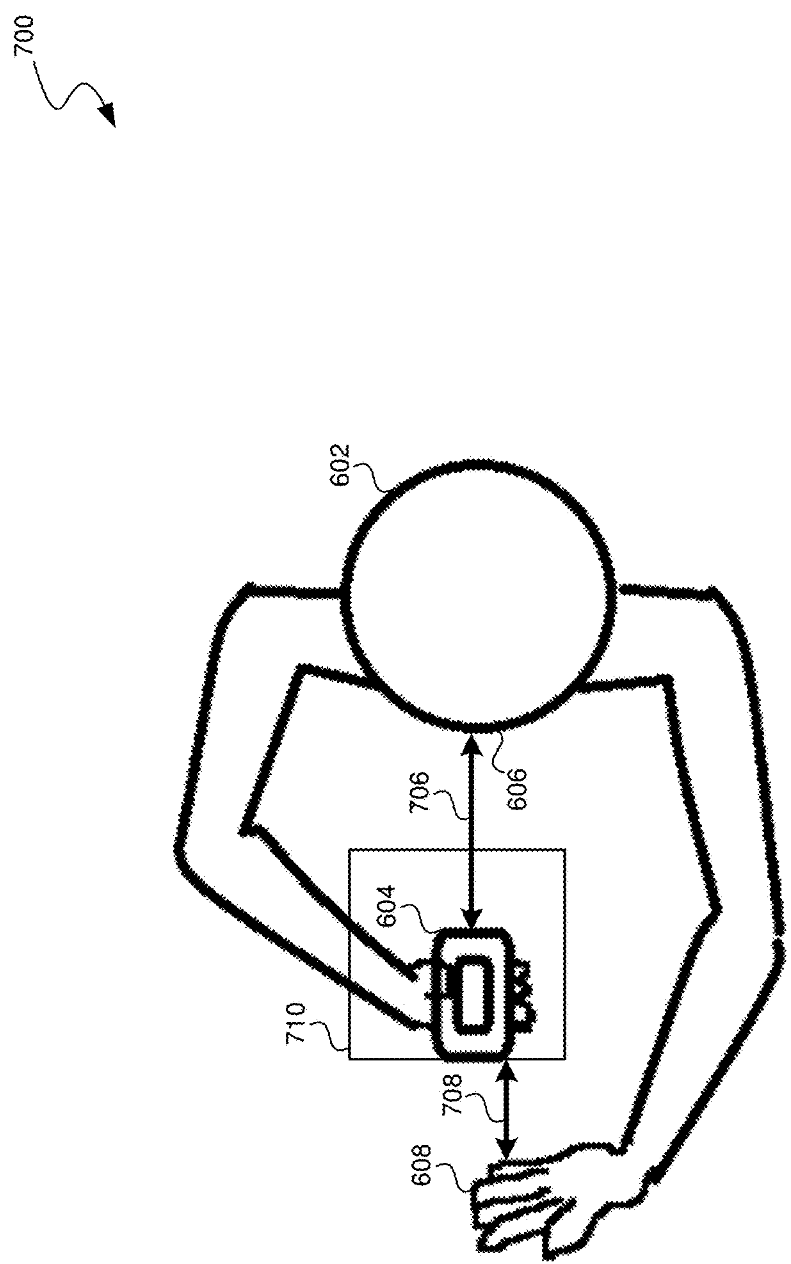
FIG. 7 is a conceptual diagram illustrating, from a top view, an example of a user using a mobile device to capture both hand and facial images.

FIG. 7 is a conceptual diagram illustrating a top view of an example 700 of the user 602 from example 600 using the mobile device 604 to capture both hand and facial images. Example 700 illustrates the spatial determinations relating the mobile device 604 with positions of the user 602's body parts. In particular, the holographic calling system determines a distance and orientation 706 between the user's face 606 and the mobile device 604 and a distance and orientation 708 between the user's hand 608 and the mobile device 604. When the holographic calling system causes the artificial reality device of the recipient to render the hand and face holograms of the sending user 602, these holograms are positioned relative to one another according to the distance and orientations 706 and 708. Example 700 also illustrates a capture zone 710, which the holographic calling system uses to determine whether the mobile device 604 is positioned to capture images sufficient to generate hand and face holograms.

Figure 8:
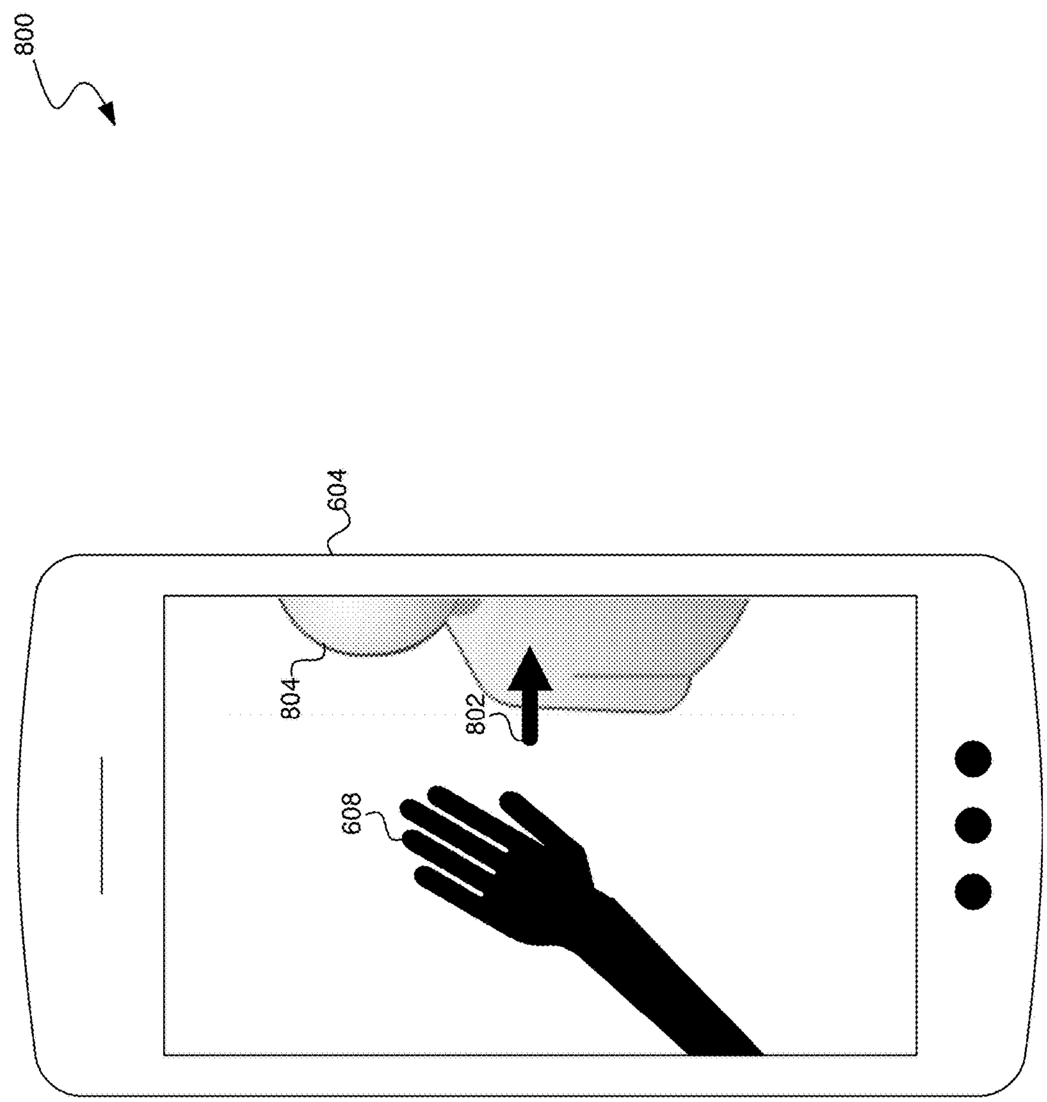
FIG. 8 is a conceptual diagram illustrating an example of affordances provided via a mobile device for instructing a user on capturing both hand and facial images.

FIG. 8 is a conceptual diagram illustrating an example 800 of affordances provided via a mobile device for instructing a user on capturing both hand and facial images. In example 800, a sending user is using her mobile device 604 to conduct a holographic call with a recipient user, a representation 804 of whom is displayed on the mobile device 604. The mobile device 604 is also showing a feed from the back-facing camera, which depicts the sending user's hand 608. During the holographic call, the sending user has positioned the mobile device 604 outside the capture zone 710. This caused the holographic calling system to determine that the mobile device 604 needs to be moved to the right to put it back in the capture zone 710, and thus has provided arrow affordance 802 on the mobile device 604's screen, instructing the user to move the mobile device 604 to the right.

FIGS. 9A and 9B are conceptual diagrams illustrating examples 900 and 950 of holographic representations provided by a recipient artificial reality device as a result of both hand and facial images captured by a sender mobile device. In example 900, the images taken by a front-facing camera of a sending user have been used to generate a holographic representation of the sending user's face 902. The images taken by a back-facing camera of a sending user have been used to generate a holographic representation of the sending user's hand 904. The holographic representation of the sending user's face 902 was created by using captured depth data of the sending user to generate a 3D mesh of the sending user's face, with a texture added from captured RGB data of the front-facing cameras. The holographic representation of the sending user's hand 904 was created by applying a machine learning model, to the images from the back-facing cameras, to obtain a kinematic model of the sending user's hand. The kinematic model was used to generate a 3D mesh of the sending user's hand in that position from an existing hand model sized to match the size of the sending user's hand/arm. The 3D mesh of the sending user's hand was then painted to match clothing and skin tone determined for the sending user. Thus, even through the palm side of the sending user was not captured by the sending user's mobile device, the hologram 904 of the sending user's hand illustrates a representation of the sending user's palm, with her hand positioned as it was captured. In example 900, the holograms fade to black at the edges of where the images were captured.

In example 950, the images taken of a sending user by both the front-facing camera and the back-facing camera of the sending user's mobile device have been used to determine a kinematic model of the sending user. The kinematic model was created by applying a machine learning model trained to produce a kinematic model (body point positions) based on images from the front and back facing cameras. The kinematic model was used to position a previously created avatar 952 of the sending user. The previously created avatar 952 has a default position with a neutral face and her hands at her sides. However, determined head position 954, facial expressions, and hand/arm positions 956 are applied from the produced kinematic model to cause the previously created avatar 952 to be positioned to match the pose of the sending user.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for implementing a holographic call between an artificial reality device and mobile device using front and back facing cameras of the mobile device, the method comprising:

obtaining a first set of one or more images captured by a front-facing camera of a mobile device, the first set of one or more images depicting a sending user's face;

obtaining a second set of one or more images captured by a back-facing camera of the mobile device, the second set of one or more images depicting a sending user's hand;

determining a first spatial relationship, based at least on the first set of one or more images, between the mobile device and the sending user's face;

determining a second spatial relationship, based at least on the second set of one or more images, between the mobile device and the sending user's hand; and causing an artificial reality device of a recipient user to render:

a representation of the sending user's face, and a representation of the sending user's hand, wherein the artificial reality device of a recipient user positions the representation of the sending user's face relative to the representation of the sending user's hand based on the first and second spatial relationships.

2. The method of claim 1 further comprising:

determining a position of the mobile device relative to the world around it;

wherein the artificial reality device of the recipient user further positions both the representation of the sending user's face and the representation of the sending user's hand relative to the recipient user based on the determined position of the mobile device relative to the world around it.

3. The method of claim 1, wherein the obtaining the first set of one or more images includes capturing depth data for at least a portion of at least one of the first set of one or more images; and wherein the determining the first spatial relationship is based on the captured depth data.

4. The method of claim 1, wherein the determining the first spatial relationship is performed by:

applying a machine learning model, trained to generate kinematic model data, to at least one image from the first set of one or more images;

generating a kinematic model from output of the applying the machine learning model; and determining the first spatial relationship based on the kinematic model.

5. The method of claim 1, wherein the causing is performed by sending the first set of one or more images and/or the representation of the sending user's face to the artificial reality device of the recipient user.

6. The method of claim 1, wherein the causing is performed by sending position and/or pose data for at least the sending user's face and the sending user's hand to the artificial reality device of the recipient user.

7. The method of claim 1, wherein the representation of the sending user's face and the representation of the sending user's hand are portions of a predefined avatar for the sending user, positioned based on the determined first spatial relationship and second spatial relationship.

8. The method of claim 1, wherein the representation of the sending user's face is a 3D mesh generated based on depth data determined for at least some of the first set of one or more images and with a texture applied to the 3D mesh based on the first set of one or more images.

9. The method of claim 1, wherein the representation of the sending user's face is a 3D mesh generated based on depth data determined for at least some of the first set of one or more images and with a texture applied to the 3D mesh based on the first set of one or more images; and wherein the representation of the sending user's hand is an extrapolation showing a representation of a portion of the sending user's hand, not depicted in the second set of one or more images, which is positioned based on a kinematic model defined for the sending user's hand.

10. A non-transitory computer-readable storage medium storing instructions that, when executed by a computing system, cause the computing system to perform a process for implementing a holographic call between an artificial reality device and mobile device using front and back facing cameras of the mobile device, the process comprising:

obtaining a first set of one or more images captured by a front-facing camera of a mobile device, the first set of one or more images depicting a sending user's face;

obtaining a second set of one or more images captured by a back-facing camera of the mobile device, the second set of one or more images depicting a sending user's hand;

determining, based on the first and second image sets, a first spatial relationship between the mobile device and the sending user's face and a second spatial relationship between the mobile device and the sending user's hand; and causing an artificial reality device to render a representation of the sending user's face and a representation of the sending user's hand, wherein the representation of the sending user's face is positioned, based on the first and second spatial relationships, relative to the representation of the sending user's hand.

11. The non-transitory computer-readable storage medium of claim 10, wherein the causing is performed by sending the first set of one or more images and/or the representation of the sending user's face to the artificial reality device or to an intermediate device that generates the representation of the sending user's face.

12. The non-transitory computer-readable storage medium of claim 10, wherein the obtaining the first set of one or more images and/or the obtaining the second set of one or more images includes capturing depth data for at least a portion of the images captured.

13. The non-transitory computer-readable storage medium of claim 10, wherein the obtaining the first set of one or more images includes capturing depth data for at least a portion of at least one of the first set of one or more images; and wherein the determining the first spatial relationship is based on the captured depth data.

14. The non-transitory computer-readable storage medium of claim 10, wherein the determining the first spatial relationship is performed by:

applying a machine learning model, trained to generate kinematic model data, to at least one image from the first set of one or more images;

generating a kinematic model from output of the applying the machine learning model; and determining the first spatial relationship based on the kinematic model.

15. A computing system for implementing a holographic call between an artificial reality device and mobile device using front and back facing cameras of the mobile device, the computing system comprising:

one or more processors; and one or more memories storing instructions that, when executed by the one or more processors, cause the computing system to perform a process comprising:

obtaining a first set of one or more images captured by a front-facing camera of a mobile device, the first set of one or more images depicting a sending user's face;

obtaining a second set of one or more images captured by a back-facing camera of the mobile device, the second set of one or more images depicting a sending user's hand;

determining, based on the first and second image sets, a first spatial relationship between the mobile device and the sending user's face and a second spatial relationship between the mobile device and the sending user's hand; and causing an artificial reality device to render a representation of the sending user's face and a representation of the sending user's hand, wherein the representation of the sending user's face is positioned, based on the first and second spatial relationships, relative to the representation of the sending user's hand.

16. The computing system of claim 15, wherein the causing is performed by sending position and/or pose data for at least the sending user's face and the sending user's hand to the artificial reality device.

17. The computing system of claim 15, wherein the representation of the sending user's face and the representation of the sending user's hand are portions of a predefined avatar for the sending user, positioned based on the determined first spatial relationship and second spatial relationship.

18. The computing system of claim 15, wherein the representation of the sending user's face is a 3D mesh generated based on depth data determined for at least some of the first set of one or more images and with a texture applied to the 3D mesh based on the first set of one or more images.

19. The computing system of claim 15, wherein the representation of the sending user's face is a 3D mesh generated based on depth data determined for at least some of the first set of one or more images and with a texture applied to the 3D mesh based on the first set of one or more images; and wherein the representation of the sending user's hand is an extrapolation showing a representation of a portion of the sending user's hand, not depicted in the second set of one or more images, which is positioned based on a kinematic model defined for the sending user's hand.

20. The computing system of claim 15, wherein the causing is performed by sending the first set of one or more images and/or the representation of the sending user's face to the artificial reality device or to an intermediate device that generates the representation of the sending user's face.

* * * * *